United States Patent

Urban

[15] 3,635,820

[45] Jan. 18, 1972

[54] TREATING A WATER STREAM CONTAINING A WATER-SOLUBLE SULFITE COMPOUND

[72] Inventor: Peter Urban, Northbrook, Ill.

[73] Assignee: Universal Oil Products Company, Des Plains, Ill.

[22] Filed: Aug. 31, 1970

[21] Appl. No.: 68,274

[52] U.S. Cl. ...................................210/61, 23/2, 23/115, 23/181
[51] Int. Cl. .........................................................C02b 1/18
[58] Field of Search.................55/47, 48, 53, 73, 74; 210/50, 210/61, 48; 23/2, 115, 181

[56] References Cited

UNITED STATES PATENTS

| | | | |
|---|---|---|---|
| 2,863,732 | 12/1958 | Bowers et al. | 210/53 X |
| 3,438,722 | 4/1969 | Heredy et al. | 23/2 |
| 3,438,727 | 4/1969 | Heredy | 23/181 |
| 3,438,728 | 4/1969 | Grantham | 23/181 |
| 3,495,941 | 2/1970 | Van Helden | 23/181 X |
| 3,511,027 | 5/1970 | Roberts et al. | 55/51 X |

*Primary Examiner*—Michael Rogers
*Attorney*—James R. Hoatson, Jr. and Thomas K. McBride

[57] ABSTRACT

A water stream containing a water-soluble sulfite compound is treated in order to reduce its total sulfur content while minimizing the formation of sulfate byproducts by the steps of: (a) converting the sulfite compound contained in the water stream to the corresponding thiosulfate compound; (b) catalytically reacting the resulting thiosulfate compound with hydrogen at reduction conditions selected to produce the corresponding sulfide compound; and thereafter (c) stripping hydrogen sulfide from an effluent stream from step (b) to form a substantially sulfate-free treated water stream which is substantially reduced in total sulfur content relative to the input water stream. Principal utility of this treatment procedure is associated with the regeneration of a sulfite-containing absorbent stream which is commonly produced by contacting a flue gas stream containing sulfur dioxide with a suitable aqueous absorbent stream containing an alkaline reagent.

21 Claims, 1 Drawing Figure

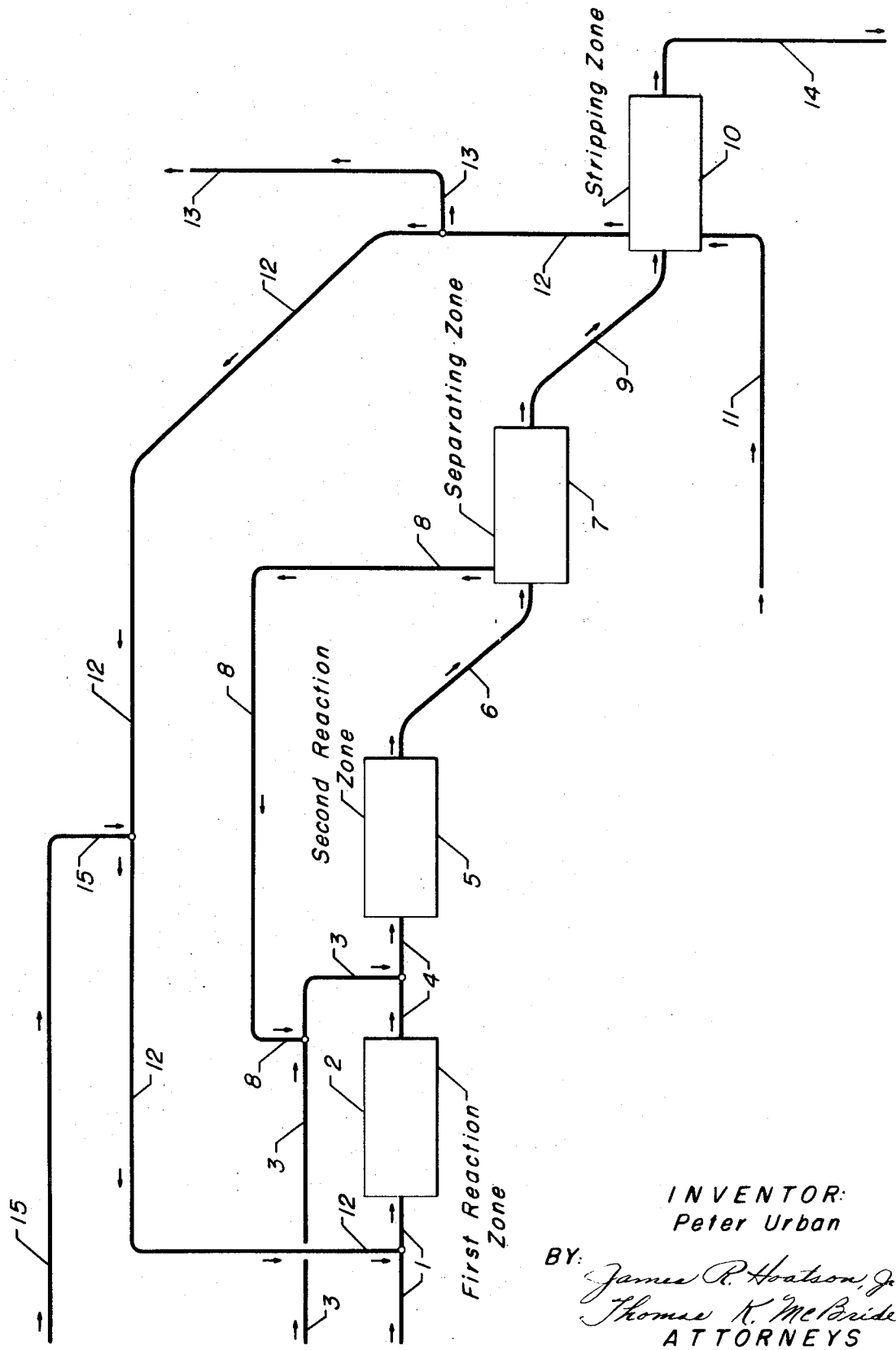

TREATING A WATER STREAM CONTAINING A WATER-SOLUBLE SULFITE COMPOUND

The subject of the present invention is a three-step method for the selective treatment of an aqueous stream containing a water-soluble sulfite compound in order to reduce its total sulfur content (i.e., the total amount of sulfur contained therein in any form, expressed on an elemental sulfur basis) to the point where it can be reused in the process which produced it, or alternatively, it can be safely discharged into a suitable sewer without causing a major pollution problem. More precisely, the present invention involves a novel three-step method for treating a sulfite-containing water stream wherein the first step involves conversion of the sulfite compound to the corresponding thiosulfate compound, the second step relates to the reduction of the resulting thiosulfate compound to form the corresponding sulfide compound and the final step involves the stripping of hydrogen sulfide from the solution produced in the second step to form the treated water stream. In one important aspect, the present invention concerns the treatment of an aqueous stream containing ammonium sulfite to produce hydrogen sulfide and a treated aqueous stream having a greatly reduced total sulfur content and which is substantially free of ammonium sulfate. In another important aspect, the present invention relates to the treatment of a rich absorbent stream, which is produced by scrubbing a gas stream containing sulfur dioxide with an aqueous solution containing a suitable alkaline reagent, in order to regenerate the absorbent stream so that it can be reused to absorb additional quantities of sulfur dioxide.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., the produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide-containing gas stream with an aqueous absorbent stream which typically contain materials which chemically or physically react with the sulfur dioxide in order to absorb same into the liquid solution. A common procedure involves the use of a solution of an alkaline reagent such as ammonium hydroxide, sodium hydroxide, sodium carbonate, ammonium carbonate, and the like alkaline reagents, to produce a rich absorbent stream containing the corresponding sulfite compound. Likewise, similar aqueous solution containing salts of sulfurous acid are produced in many areas of modern industry such as in the chemical, petrochemical, pharmaceutical, steel, paper, food, fertilizer, petroleum and the like industries.

Because these water streams contain sulfite compounds, their discharge into a waste water sewer can cause substantial well-known water pollution problems including excessive biological oxygen demand, poisoning of marine and plant life and the like. Regardless of the source of these aqueous sulfite-containing streams, it is clear that there is a substantial need for a simple and effective method for treating them in order to allow their reuse in the processes which produced them or their safe discharge into a suitable sewer. In the case where the treated water stream is to be recycled to the process which produced the input water stream, it is generally required that the treated water streams be substantially free of sulfate compounds. The reason for this requirement is that these compounds, once formed, are very intractable and in a closed system tend to build up in the recycle water stream until finely divided solids are formed. These solids then can precipitate in the form of a scale or sludge which can foul the internals of the equipment using this recycle stream. For instance, when the treated stream is recycled to a gas scrubbing process, these sulfate compounds can cause severe corrosion and erosion difficulties in the scrubbing equipment, plus they can foul the internals of the scrubbing means. When a drag stream is withdrawn from the process and discarded or treated by a method such as crystallization, evaporation, filtration, etc., to remove these sulfate compounds valuable alkaline reagent is typically lost from the system. Moreover, the yield of sulfur recovered during the water treatment operation is detrimentally affected by these sulfate byproducts.

One solution that has been proposed to the problem of treating these sulfite-containing water streams is the use of a suitable reducing agent to react with the sulfite compounds contained therein to make elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation reduction at the conditions necessary for direct reduction.

The problems addressed by the present invention are, therefore, to provide a procedure for treating these sulfite-containing water streams to enable the recovery of hydrogen sulfide therefrom in a highly selective manner, to produce a treated aqueous stream of greatly reduced total sulfur content and to minimize the amount of undesired sulfate byproducts.

I have now found a method for treating an input water stream containing a water-soluble sulfite compound which enables the recovery of hydrogen sulfide in high yields, minimizes the formation of undesired sulfate byproducts and produces a treated water stream which is of relatively low total sulfur content. This treated water stream is, moreover, suitable for direct recycling to a scrubbing process wherein $SO_2$ is scrubbed from a gas containing same. The concept of the present invention is based on my finding that the sulfite compound contained in this input water stream can be easily converted at relatively low severity conditions to the corresponding thiosulfate compound in a highly selective manner without forming any substantive amounts of undesired, intractable sulfate compounds. Coupled with this finding is my additional observation that the thiosulfate compound can be reduced in a highly selective, economic and efficient manner by hydrogen to form the corresponding sulfide compound from which hydrogen sulfide can be easily recovered. Thus, the central point of the instant method involves using the thiosulfate as an intermediate in a multistep procedure to reduce a sulfite compound to hydrogen sulfide, rather than an attempt to directly reduce the sulfite compound to sulfide in a one-step procedure. This sulfite to thiosulfate to sulfide route provides a procedure which facilitates careful control of byproduct formation during the treatment procedure and enables the recovery of a treated water stream which can be recycled to a sulfur dioxide scrubbing operation.

It is, accordingly, an object of the present invention to provide a simple, effective, efficient and selective method for treating a sulfite-containing water stream to produce hydrogen sulfide and a treated water stream of greatly reduced total sulfur content while minimizing the formation of undesired, refractory sulfate byproducts.

In brief summary, the present invention is, in one embodiment, a method for treating an input water stream containing a water-soluble sulfite sulfite-containing in order to reduce its total sulfur content while minimizing the formation of undesired sulfate byproducts. In the first step of the method, the sulfite-containing water stream is reacted with a reducing agent selected from the group consisting of finely divided sulfur, a polysulfide compound, a water-soluble sulfide compound and mixtures thereof, at reaction conditions selected to form a thiosulfate-containing effluent stream. Thereafter, the effluent stream from the first step is catalytically treated, in the second step, with hydrogen at reduction conditions selected to result in a substantially thiosulfate-free effluent stream containing the corresponding sulfide compound. In the final step, hydrogen sulfide is stripped from the effluent stream recovered from the second step to form a substantial sulfate-free treated water stream which is substantially reduced in total sulfur content relative to the input water stream.

In a more specific embodiment, the present invention is a method for treating an input water stream containing ammonium sulfite in order to reduce its total sulfur content while minimizing the formation of ammonium sulfate. The first step here involves reacting the input water stream with hydrogen sulfide at reaction conditions selected to form an effluent stream containing ammonium thiosulfate. In the second step, the effluent stream from the first step and hydrogen are contacted with a reduction catalyst, comprising cobalt sulfide combined with a carrier material at reduction conditions selected to produce a substantially thiosulfate-free aqueous effluent stream containing ammonium hydrosulfide. Following this last step, hydrogen sulfide is stripped from the aqueous effluent stream produced in the second step to form a hydrogen sulfide-containing overhead stream and a treated water stream which is substantially reduced at total sulfur content relative to the input water stream and is substantially free of ammonium sulfate. A portion of the overhead stream from the stripping step is then, in the final step, passed to the first step in order to supply hydrogen sulfide reactant thereto.

In another embodiment, the present invention comprises a method as described above in the first embodiment wherein the second step is performed in the presence of a catalyst comprising an iron group metallic component combined with a carrier material.

Other objects and embodiments of the present invention are hereinafter disclosed in the following discussions of the input streams, the preferred conditions, the output streams, preferred reactants and mechanics associated with each of the essential and preferred steps of the present invention.

As indicated above, the first step of the present method involves, the conversion, in a highly selective manner of the sulfite compound contained in the input water stream to the corresponding thiosulfate compound. The sulfite compound contained in this input water stream is generally characterized as water-soluble. Examples of water-soluble sulfite compounds are sulfite salts of relatively strong bases such as ammonium sulfite, the alkali metal sulfites and the alkaline earth sulfites. In addition to the normal sulfite salts, it is intended to include the bisulfite salts of the relatively strong bases. Especially suitable alkali metal sulfite compounds are sodium sulfite and potassium sulfite. Likewise, suitable alkaline earth sulfites are exemplified by magnesium sulfite. The preferred sulfite compounds for purposes of the present invention are ammonium sulfite and sodium sulfite. Ordinarily, the sulfite compound will be present in this input water stream in an amount ranging from about 0.01 wt. percent up to the solubility limit of the particular sulfite compound in water at the conditions utilized in this first step. Particularly good results are obtained when the input water stream contains about 0.1 to about 25 wt. percent of the sulfite compound. It is to be noted that in many cases the aqueous input stream to this step will contain a mixture of a normal sulfite salt and a bisulfite salt such as a mixture of $(NH_4)_2 SO_3$ and $NH_4SO_3$ or a mixture of $Na_2SO_3$ and $NaH SO_3$.

The reducing agent utilized in this first step is selected from the group consisting of finely divided sulfur, a polysulfide compound, a water-soluble sulfide compound and mixtures thereof. In the first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the first step should be sufficient to supply one atom of sulfur per molecule of sulfite compound contained in the input water stream with the preferred amount corresponding to about one to about three atoms of sulfur per mole of sulfite compound.

In a second mode of operation for this first step, the reducing agent is a polysulfide compound. Suitable polysulfide compounds include the ammonium, alkali metal, and alkaline earth polysulfides. Best results are ordinarily obtained with ammonium polysulfide or sodium polysulfide. The polysulfide compound is ordinarily charged to this first step in the form of an aqueous solution containing about 1 to about 50 wt. percent of the polysulfide compound. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfite compound contains four atoms of elemental sulfur and one atom of sulfide (e.g., $(NH_4)_2 S_5$), the stoichiometric amount is one-sixth moles of polysulfide per mole of sulfite compound, with a preferred value being about one-fourth to about three-fourths or more moles of polysulfide per mole of sulfite compound.

In a third mode of operation of this first step, the reducing agent is a water-soluble sulfide compound. Suitable water-soluble sulfide compounds are hydrogen sulfide, ammonium sulfide, ammonium hydrosulfide and the sulfides and hydrosulfide salts of the alkali and alkaline earth metals. Best results are ordinarily obtained in this mode of operation of this step when the sulfide reactant is hydrogen sulfide or ammonium hydrosulfide or sodium sulfide. The amount of this sulfide reactant utilized in this step is at least sufficient to provide 0.5 moles of sulfide compound per mole of sulfite compound in the input water stream, with best results obtained at a mole ratio corresponding to about 0.6 to about 1.5 or more. Likewise, in this third mode of operation, good results are ordinarily obtained when the pH of the input water stream is in the range of 4 to about 8.

The reaction conditions utilized in this first step can be generally described as thiosulfate production conditions and comprise: a temperature of about 20° to about 150° C., a pressure sufficient to maintain the input water stream in the liquid phase and a contact time corresponding to about 0.05 to 1 or more hours. In general, the contact time necessary for the desired reaction is a function of the reducing agent utilized, with relatively short contact times of about 1 to 5 minutes being sufficient in the case where the reducing agent is a polysulfide compound. The other two reducing agents require a relatively longer contact time ranging up to about 0.5 to about 1 hour. Considering all of the factors involved in the operation of this first step, best results are ordinarily obtained when the reducing agent is hydrogen sulfide or sodium sulfide, or a polysulfide compound, particularly ammonium polysulfide.

Following this first step, an aqueous effluent stream containing relatively large amounts of a thiosulfate compound is withdrawn therefrom and passed to the second step of the present method wherein it is catalytically treated with hydrogen at reduction conditions selected to produce the corresponding sulfide compound. This reduction step is effected by contacting the aqueous effluent stream and a hydrogen stream with a suitable reduction catalyst at reduction conditions selected to reduce the thiosulfate compound contained in this effluent stream to the corresponding sulfide compound and $H_2O$.

This reduction step can be carried out in any suitable manner taught in the art for contacting a liquid stream and a gas stream with a solid catalyst. A particularly preferred method involves a fixed-bed catalyst system in which the catalyst is disposed in the reduction zone and the thiosulfate-containing aqueous solution is passed therethrough in either upward, radial, or downward flow with a hydrogen stream being simultaneously introduced in either countercurrent or concurrent flow relative to the aqueous stream. In particular, a preferred embodiment involves downflow and concurrent flow of the aqueous stream and the hydrogen stream through the reduction zone.

This reduction step can, moreover, be carried out with any suitable reduction catalyst known to be capable of reducing a thiosulfate compound to the corresponding sulfide compound. Based on my investigations I have determined that particularly good results are obtained with a catalyst comprising metallic component selected from the metallic group consisting of the transition metals of groups VI and VIII such as chromium, molybdenum, tungsten, iron, cobalt, nickel, platinum, palladium etc., combined with a suitable carrier material. More specifically, preferred catalysts for the desired reduction reaction comprise a combination of a group VI or a group VIII transition metal component with a suitable porous support such as alumina or activated carbon. Particularly preferred embodiments of the present method involve the use of catalysts in which the metallic component is present in the form of a metallic sulfide such as cobalt sulfide, iron sulfide, nickel are obtained sulfide, or tungsten sulfide combined with a carrier material. The preferred carrier materials are activated carbons or charcoals such as those commercially available under the trade names of Norite, Nuchar, Darco and other similar products. In addition, conventional natural or synthetic highly porous inorganic refractory oxide carrier materials may be used as the support for the metallic component such as alumina, silica zirconia, silica-alumina, bauxite, clay, etc. Preferred results are ordinarily obtained with a catalyst comprising an iron group metallic component combined with relatively small particles of a suitable solid carrier material. That is, preferred results are obtained with a catalyst having a metallic component selected from the compound and metals of iron, cobalt and nickel, with the oxides and sulfides of these metals being especially preferred. Excellent results are obtained when the reduction catalyst is cobalt sulfide combined with a suitable refractory inorganic oxide carrier material such as alumina, or cobalt sulfide combined with activated carbon.

An acceptable method for making this reduction catalyst comprises impregnating the carrier material with an aqueous solution of a soluble salt of the metallic component such as the acetate salt, the chloride salts, the nitrate salts, etc. The metallic component of the resulting composite can then be converted to the sulfide by treatment with hydrogen sulfide preferably at room temperature. The resulting sulfided composite is thereafter washed with an aqueous and/or ammoniacal solution and dried. In the case where the carrier material is a refractory inorganic oxide, it may be advantageous to calcine or oxidize the impregnated carrier material at a relatively high temperature to obtain a distribution of the metallic component on the carrier material which can thereafter be sulfided with a suitable sulfur compound in order to obtain the desired catalyst.

In general, the metallic component is preferably composited with the carrier material in an amount sufficient to result in the reduction catalyst containing about 0.1 to about 25 wt. percent of the metallic component, calculated as the elemental metal. For the preferred cobalt sulfide catalyst, the amount of cobalt incorporated is preferably in an amount sufficient to result in a reduction catalyst containing about 1 to about 10 wt. percent cobalt as cobalt sulfide.

An essential reactant for the reduction step is hydrogen. The hydrogen stream charged to the reduction step may be substantially pure hydrogen or a mixture of hydrogen with other relatively inert gases, such as a mixture of hydrogen with $C_1$ to $C_4$ hydrocarbons, a mixture of hydrogen and nitrogen, a mixture of hydrogen and carbon dioxide, a mixture of hydrogen and hydrogen sulfide, etc. The excess recycle gas obtained from various petroleum processes which have a net hydrogen make, such as a reforming process, a dehydrogenation process, etc., may also be used if desired. It is preferred that the hydrogen be utilized in an amount equivalent to or greater than the stoichiometric amount required for the reduction of thiosulfate to sulfide. The stoichiometric amount is 4 moles of hydrogen per mole of thiosulfate. In general, it is preferred to operate at a hydrogen to thiosulfate mole ratio substantially greater than this stoichiometric amount. Hence, about 4 to about 100 moles of hydrogen per mole of the thiosulfate compound contained in the aqueous stream charged to the reduction step is preferably used, with best results obtained at a mole ratio of about 20:1 to about 50:1. It is understood that the unreacted hydrogen recovered from the effluent from this reduction step can be recycled, if desired, through suitable compressive means to supply at least a portion of the hydrogen for the reduction step.

The conditions utilized in the reduction step are generally described as reduction conditions effecting conversion of thiosulfate to sulfide. The temperature utilized is preferably selected from the range of about 125° to about 350° C. The pressure employed is typically a pressure which is sufficient to maintain the aqueous stream containing the thiosulfate compound in liquid phase. In general, it is preferred to operate at superatmospheric pressures and preferably a pressure of about 100 to about 3,000 p.s.i.g. Moreover, it is preferred to use a liquid hourly space velocity (defined on the basis of the volume charge rate of the aqueous stream divided by the total volume of the reduction catalyst within the reduction zone) ranging from about 0.5 to about 10 hr.$^{-1}$, with best results obtained at about 1 to about 3 hr.$^{-1}$.

In a preferred embodiment of the reduction step wherein the aqueous stream containing the thiosulfate compound and the hydrogen stream are concurrently contacted with the reduction catalyst, the effluent stream withdrawn from the reduction zone contains the sulfide product of the reduction reaction, a very minor amount of unreacted thiosulfate, hydrogen, water and the alkaline reagent. For example in the case where the aqueous stream contains ammonium thiosulfate, the sulfide product of reduction reaction is typically present as ammonium hydrosulfide or as hydrogen sulfide or a mixture of these, with the amount of ammonium hydrosulfide present therein depending primarily upon the amount of ammonia present in the influent to the reduction step. Unreacted hydrogen is typically separated from the aqueous effluent stream from the reduction step in a separating zone and recycled to the reduction zone.

In the next step of the present invention the aqueous effluent stream recovered from the thiosulfate reduction step is subjected to a stripping step designed to liberate hydrogen sulfide therefrom. Although any suitable stripping gas can be utilized including steam, nitrogen, air and the like, carbon dioxide is particularly preferred, because it acts to decrease the pH of the solution and form the corresponding carbonate salt. For instance, in the case where the effluent stream from the second step contains ammonium hydrosulfide, stripping with carbon dioxide liberates hydrogen sulfide and produces ammonium carbonate and ammonium bicarbonate. In another mode of operation of this step, the effluent water stream from the thiosulfate reduction step can be subjected to conditions sufficient to generate upflowing water vapors and to decompose the sulfide compound contained in this stream. For example, in the typical case where this water stream contains ammonium hydrosulfide, acceptable decomposition conditions are a temperature of about 50° to 200° C. and a pressure of about 0 to about 200 p.s.i.g. Typically this decomposition mode of operation is conducted in a conventional distillation column wherein upflowing stripping vapors are generated by supplying heat to the bottom of the column by means such as a steam coil or conventional reboiler. Regardless of which mode of operation is employed in this stripping step, an overhead stream containing hydrogen sulfide will be produced. Likewise, a treated water stream which is substantially reduced in total sulfur content and is substantially sulfate-free will be recovered therefrom.

As indicated, this treated water stream is substantially reduced in total sulfur content relative to the input water stream and usually will contain substantially less than 10 percent of the amount of sulfur contained in the input water stream. In the case where the carbon dioxide is utilized in this final step as the stripping medium, the treated water stream will contain substantial amounts of the carbonate salt of the alkaline reagent originally present in the input water stream— for example in the case where the alkaline reagent is ammonia, the treated water stream will contain ammonium carbonate and ammonium bicarbonate.

In one preferred embodiment of the instant method, a portion of the hydrogen sulfide-containing overhead stream produced in the stripping step is passed to the first step in order to supply the reducing agent thereto. The remaining portion of this hydrogen sulfide-containing stream is then recovered as one of the product streams from the instant method. The hydrogen sulfide contained in this product stream can be converted to elemental sulfur by any suitable oxidation procedure such as a conventional Claus process, if desired.

Having broadly characterized the essential steps comprising the present method, reference is now made to the attached drawing for a detailed explanation of a working example of a preferred flow scheme for the present invention. The attached drawing is merely intended as a general representation of the flow scheme involved with no intention to give details about heaters, coolers, pumps, valves and the like equipment except where a knowledge of these devices is essential to an understanding of the present invention or would not be self-evident to those skilled in the relevant art.

Referring now to the attached drawing, an aqueous waste stream containing ammonium sulfite and bisulfite in an amount of about 10 wt. percent thereof is continuously introduced into the system via line 1, heated to about 100° C. by heating means (not shown) and passed into the upper region of the first reaction zone, 2. Zone 2 is a conventional liquid gas contacting zone designed to effect intimate contact between a downflowing mixture of a liquid stream and a gas stream. Also introduced into zone 2 via lines 12 and 1 is a gas stream containing hydrogen sulfide. During startup of zone 2 sufficient $H_2S$ is introduced therein via lines 15,12 and 1 to initiate the desired reduction reaction. Thereafter, a portion of a hydrogen sulfide-containing overhead gas stream which is produced in a subsequently described stripping step, is passed from zone 10 to zone 2 via lines 12 and 1. In either case, the amount of hydrogen sulfide supplied to zone 2 is sufficient to react about 0.5 moles of hydrogen sulfide per mole of ammonium sulfite charged to this zone. By conventional means, zone 2 is maintained at a temperature of about 100° C., and a pressure of about 200 p.s.i.g., the residence time of the reactants in zone 2 is about 0.5 hours. In addition, the pH of the input water stream entering zone 2 via line 1 is maintained in the range of about 4 to about 7.

An effluent stream is then withdrawn from zone 2 via line 4, heated to about 200° C. by heating means (not shown) and charged to the second reaction zone, zone 5. This aqueous effluent stream contains ammonium thiosulfate in an amount corresponding to a conversion in zone 2 of greater than 95 percent of the input ammonium sulfite to ammonium thiosulfate. Furthermore, the amount of undesired ammonium sulfate contained in this stream is less than 3 percent of the input ammonium sulfite. Accordingly, the aqueous effluent stream from zone 2 principally contains ammonium thiosulfate, with minor amounts of unreacted ammonium sulfite, ammonium hydrosulfide and ammonium hydroxide and with only a trace amount of ammonium sulfate. In the case where carbon dioxide is used to aid stripping in zone 10, this effluent stream will also contain minor amounts of $(NH_4)_2CO_3$ and $NH_4HCO_3$.

The second reaction zone, zone 5, is another liquid gas reaction zone designed to effect intimate contact between a hydrogen-containing gas stream, a liquid stream, and a solid bed of reduction catalyst. The aqueous effluent stream from zone 2 is introduced into the upper region of zone 5. Likewise, a hydrogen-containing gas stream is introduced into zone 5 by means of lines 3 and 4. After startup of the process, a substantial portion of this hydrogen stream is obtained by recycling the gas phase separated in zone 7 by means of lines 8, 3 and 4. Zone 5 contains a catalyst comprising 12 to 20 mesh particles of activated carbon (Darco carbon) having 2 cobalt sulfide component combined therewith in an amount of about 2.3 wt. percent, calculated on an elemental cobalt basis. The amount of hydrogen introduced into zone 5 via lines 3 and 4 corresponds to a hydrogen to ammonium thiosulfate mole ratio of 40:1. The reduction conditions maintained in zone 5 are a temperature of 200° C., a pressure of 300 p.s.i.g., and a liquid hourly space velocity of 1 hr.$^{-1}$.

An effluent stream is then withdrawn from zone 5 via line 6, cooled to a temperature of about 100° C. by cooling means (not shown) and passed to separating zone 7. In zone 7, a hydrogen-rich gas phase separates from an aqueous phase. Zone 7 is operated at a pressure which is slightly below that in zone 5. The gas phase produced therein contains the unreacted hydrogen, hydrogen sulfide and water vapor. The gas phase is withdrawn from zone 7 via line 8 and recycled to zone 5 through compressive means (not shown) via lines 3 and 4. At the junction of lines 8 and 3, additional hydrogen is added to the system via line 3 in order to maintain the mole ratio of $H_2/(NH_4S_2O_3)$ within zone 5 at 40:1.

The liquid phase in zone 7 is withdrawn therefrom via line 9 and passed to upper region of stripping zone 10. This liquid phase is the aqueous portion of the effluent stream from zone 5, and it contains ammonium hydrosulfide, unreacted ammonium thiosulfate, and minor amounts of ammonium hydroxide and ammonium sulfate. An analysis of this aqueous stream indicates that 99 percent of the ammonium thiosulfate charged to zone 5 is converted therein with 89 percent of this ammonium thiosulfate being converted to the sulfide. In addition, the analysis shows that less than 5 percent of the ammonium thiosulfate is converted to the undesired refractory ammonium sulfate.

In stripping zone 10, the aqueous effluent stream from zone 5 is countercurrently contacted with an ascending stripping gas which is introduced into the lower region of zone 10 via line 11. This stripping gas comprises a mixture of carbon dioxide and steam. Zone 10 is operated in the conventional manner at a relatively low temperature and pressure as compared to zone 5. In fact excellent results are obtained at a temperature of about 100° C., and at atmospheric pressure. Zone 10 typically contains suitable means for effecting intimate contact between a descending liquid stream and an ascending gaseous stream.

An overhead stream is then withdrawn from zone 10 via line 12. It contains relatively large amounts of hydrogen sulfide, carbon dioxide and small amounts of ammonia and water. A portion of this gaseous stream is withdrawn from the system via line 13. It contains the new sulfide product of the present method, and it can be used in any manner or charged to any suitable process for the recovery of sulfur therefrom; for example, an indirect oxidation procedure like a conventional Claus unit. Another portion of this overhead gas stream is passed via lines 12 and 1 to zone 2 in order to supply hydrogen sulfide reactant thereto. A treated water stream is also withdrawn from zone 10 via line 14. It contains substantial amounts of ammonium carbonate with minor amounts of unreacted ammonium thiosulfate, unreacted ammonium sulfite, unreacted ammonium hydrosulfide and ammonium sulfate. The total sulfur content of this treated water stream is substantially less than 10 percent of the total sulfur content of the input water stream which enters the system via line 1. Moreover, this treated water stream contains only a trace amount of undesired ammonium sulfate. An overall sulfur balance on this system indicated that approximately 85 percent of the sulfur entering the process in the form of ammonium sulfite or bisulfite via line 1 is converted to hydrogen sulfide, while only less than about 3 percent of the entering sulfur is converted to undesired ammonium sulfate. These results evidence the ability of the method of the present invention to regenerate sulfite-containing water streams without producing substantial amounts of undesired sulfate byproducts.

It is intended to cover by the following claims all changes and modifications of the above disclosure of the present invention which would be self-evident to a man of ordinary skill in the water treating art.

I claim as my invention:

1. A method for treating an input water stream containing a water-soluble sulfite compound in order to reduce its total sulfur content while minimizing the formation of sulfate byproducts, said method comprising the steps of:
   a. reacting the input water stream with a reducing agent selected from the group consisting of finely divided sulfur, a polysulfide compound, a water-soluble sulfide compound and mixtures thereof, at reaction conditions selected to form a thiosulfate-containing effluent stream;
   b. catalytically treating the effluent stream from step (a) with hydrogen at reduction conditions selected to produce a substantially thiosulfate-free aqueous effluent stream containing a sulfide compound; and thereafter,
   c. stripping hydrogen sulfide from the aqueous effluent stream produced in step (b) to form a substantially sulfate-free treated water stream which is substantially reduced in total sulfur content relative to the input water stream.

2. A method as defined in claim 1 wherein the reaction conditions utilized in step (a) include a temperature of about 20° to about 150° C., and a pressure sufficient to maintain the input water stream in the liquid phase.

3. A method as defined in claim 1 wherein the reduction conditions utilized in step (b) include a temperature of about 125° to about 350° C. and a pressure sufficient to maintain the effluent stream from step (a) in the liquid phase.

4. A method as defined in claim 1 wherein the water-soluble sulfite compound is ammonium sulfite.

5. A method as defined in claim 1 wherein the water-soluble sulfite compound is an alkali metal sulfite.

6. A method as defined in claim 5 wherein said alkali metal sulfite is sodium sulfite.

7. A method as defined in claim wherein the water-soluble sulfite compound is an alkaline earth metal sulfite.

8. A method as defined in claim 7 wherein the alkaline earth sulfite is magnesium sulfite.

9. A method as defined in claim 1 wherein the amount of hydrogen charged to step (b) is sufficient to provide a mole ratio of hydrogen to thiosulfate passed thereto of at least 4:1.

10. A method as defined in claim 1 wherein the reducing agent utilized in step (a) is hydrogen sulfide.

11. A method as defined in claim 10 wherein at least a portion of the hydrogen sulfide utilized in step (a) is obtained by passing thereto a portion of the hydrogen sulfide stripped in step (c).

12. A method as defined in claim 1 wherein the reducing agent utilized in step (a) is finely divided sulfur which is used in an amount at least sufficient to provide a mole ratio of sulfur to sulfite of 1:1.

13. A method as defined in claim 1 wherein the reducing agent utilized in step (a) is a polysulfide compound which is used in an amount at least sufficient to provide a mole ratio of polysulfide to sulfite of 1:6.

14. A method as defined in claim 1 wherein the reducing agent utilized in step (a) is a water-soluble sulfide compound which is used in an amount at least sufficient to provide a mole ratio of sulfide to sulfite of 1:2.

15. A method as defined in claim 1 wherein the input water stream contains about 0.1 to about 25 wt. percent of the water-soluble sulfite compound.

16. A method as defined in claim 1 wherein step (b) comprises contacting the effluent stream from step (a) and hydrogen with a reduction catalyst, comprising an iron group metallic component combined with a carrier material, at reduction conditions selected to form a substantially thiosulfate-free aqueous effluent stream containing a sulfide compound.

17. A method as defined in claim 16 wherein said reduction catalyst comprises cobalt sulfide combined with an activated carbon carrier material.

18. A method as defined in claim 16 wherein said reduction catalyst comprises cobalt sulfide combined with a refractory inorganic oxide carrier material.

19. A method for treating an input water stream containing ammonium sulfite in order to reduce its total sulfur content while minimizing the formation of ammonium sulfate, said method comprising the steps of:
   a. reacting the input water stream with hydrogen sulfide at reaction conditions selected to form an effluent stream containing ammonium thiosulfate;
   b. contacting the effluent stream from step (a) and hydrogen with a reduction catalyst comprising cobalt sulfide combined with a carrier material, at reduction conditions selected to form a substantially thiosulfate-free aqueous effluent stream containing ammonium hydrosulfide;
   c. stripping hydrogen sulfide from the aqueous effluent stream produced in step (b) to form a hydrogen sulfide-containing overhead gas stream and a treated water stream which is substantially reduced in total sulfur content relative to the input water stream and is substantially free of ammonium sulfate; and
   d. passing a portion of the overhead stream formed in step (c) to step (a) in order to supply at least a portion of said hydrogen sulfide thereto.

20. A method as defined in claim 18 wherein hydrogen is charged to step (b) in an amount corresponding to about 4 to about 100 moles of hydrogen per mole of the thiosulfate compound passed thereto.

21. A method as defined in claim 18 wherein the reduction conditions utilized in step (b) include a temperature of about 125° to about 350° C. and a pressure sufficient to maintain the effluent stream from step (a) in the liquid phase.

* * * * *